US012803375B2

(12) United States Patent
Luo

(10) Patent No.: US 12,803,375 B2
(45) Date of Patent: Nov. 17, 2026

(54) DRIVE MOTOR AND VEHICLE

(71) Applicant: XIAOMI EV TECHNOLOGY CO., LTD., Beijing (CN)

(72) Inventor: Xuan Luo, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 531 days.

(21) Appl. No.: 18/242,266

(22) Filed: Sep. 5, 2023

(65) Prior Publication Data

US 2024/0396404 A1 Nov. 28, 2024

(30) Foreign Application Priority Data

May 24, 2023 (CN) ......................... 202310597842.9

(51) Int. Cl.

| | |
|---|---|
| ***H02K 7/04*** | (2006.01) |
| ***H02K 1/276*** | (2022.01) |
| ***H02K 1/32*** | (2006.01) |
| ***H02K 9/19*** | (2006.01) |

(52) U.S. Cl.
CPC ............... *H02K 7/04* (2013.01); *H02K 1/276* (2013.01); *H02K 1/32* (2013.01); *H02K 9/19* (2013.01)

(58) Field of Classification Search
CPC ........ H02K 1/276; H02K 1/2766; H02K 1/28; H02K 1/30; H02K 1/32; H02K 7/04; H02K 9/19; H02K 15/16
See application file for complete search history.

(56) References Cited

U.S. PATENT DOCUMENTS

| | | | | |
|---|---|---|---|---|
| 2009/0261667 A1* | 10/2009 | Matsubara ........... | H02K 1/2766 310/54 |
| 2012/0133230 A1* | 5/2012 | Jansen ................... | H02K 15/03 29/596 |
| 2019/0190335 A1* | 6/2019 | Sim .......................... | H02K 1/30 |
| 2019/0372425 A1* | 12/2019 | Tschida .................... | H02K 5/00 |
| 2023/0307968 A1* | 9/2023 | Luo .......................... | H02K 9/19 |
| 2024/0195248 A1* | 6/2024 | Asaoka .................... | H02K 5/15 |

FOREIGN PATENT DOCUMENTS

| | | |
|---|---|---|
| CN | 207819585 U | 9/2018 |
| CN | 208539677 U | 2/2019 |

(Continued)

OTHER PUBLICATIONS

CN 109861446 Machine Translation (Year: 2019).*

(Continued)

*Primary Examiner* — Naishadh N Desai
(74) *Attorney, Agent, or Firm* — Cozen O'Connor

(57) ABSTRACT

A drive motor includes: a stator, a rotor, a balance disc, and a rotation shaft. The rotor includes a rotor core and a permanent magnet in the rotor core, and the rotor core has a first end face and a second end face. The balance disc includes a first balance disc configured to abut against the first end face and a second balance disc configured to abut against the second end face. The first balance disc, the rotor core, and the second balance disc are fitted over the rotation shaft sequentially along an axial direction and are fixed by a locking member at an end. A circumferential limiting structure is arranged at least one of between the first balance disc and the first end face or between the second balance disc and the second end face, and includes a convex key and a limiting hole fitted with the convex key.

18 Claims, 9 Drawing Sheets

(56) References Cited

FOREIGN PATENT DOCUMENTS

| | | | | | |
|---|---|---|---|---|---|
| CN | 109861446 | A | * | 6/2019 | |
| CN | 113206563 | A | * | 8/2021 | ............ H02K 5/161 |
| CN | 114552832 | A | | 5/2022 | |
| CN | 115589086 | A | | 1/2023 | |
| EP | 2597188 | A1 | | 5/2013 | |
| JP | 2022051837 | A | | 4/2022 | |
| KR | 20080089882 | A | * | 10/2008 | ............ H02K 1/276 |
| WO | WO-2005043741 | A2 | * | 5/2005 | ............ H02K 15/03 |
| WO | WO 2021225902 | A1 | | 11/2021 | |
| WO | WO-2022139500 | A1 | * | 6/2022 | ............ H02K 15/35 |

OTHER PUBLICATIONS

Donaldson, Peter, Motor Laminations, E-Mobility Engineering, accessed from the Internet Archive on Aug. 5, 2025: Website captured on Jan. 28, 2022: https://web.archive.org/web/20220128023036/https://www.emobility-engineering.com/motor-laminations/#expand (Year: 2022).*

Zeng, Jianhui & Li, Liejun & Gao, Jixiang & Huo, Xiangdong & Peng, Zhengwu. (2022). Investigation of the main factors affecting the magnetic properties of silicon steel sheets by comparing three kinds of silicon steel. Journal of Physics: Conference Series (Year: 2022).*

KR 20080089882 Machine Translation (Year: 2008).*

WO 2022139500 Machine Translation (Year: 2022).*

WO 2005043741 Machine Translation (Year: 2005).*

CN 113206563 Machine Translation (Year: 2021).*

Chinese Patent Application No. 202310597842.9, Office Action dated Oct. 14, 2023, 6 pages.

Chinese Patent Application No. 202310597842.9, English translation of Office Action dated Oct. 14, 2023, 12 pages.

European Patent Application No. 23198014.5, Search and Opinion dated Mar. 6, 2024, 12 pages.

* cited by examiner

DRIVE MOTOR AND VEHICLE

CROSS-REFERENCE TO RELATED APPLICATION

This application is based on and claims priority to Chinese Patent Application No. 202310597842.9 filed on May 24, 2023, the entire content of which is incorporated herein by reference.

BACKGROUND

Drive motors, as part of core power generation systems of new energy vehicles, have excellent development prospects. Improving power density of drive motors is a high priority goal of industry development, and increasing motor speed is an effective way to improve the power density of the drive motors. Challenges faced by high-speed drive motors lie in issues such as rotor strength and rotor heat dissipation. In the terms of the rotor strength, the strength of silicon steel sheets and strength of balance discs are involved. The rotor heat dissipation is a problem derived from motors at high speed. If the problem of rotor heat dissipation at high speed cannot be solved, permanent magnets of the drive motors will be demagnetized due to high temperature caused by the high speed, resulting in permanent loss of the motor performance. Consequently, enhancing the rotor strength of high-speed drive motors and improving rotor heat dissipation are of great interest in the art.

SUMMARY

The present disclosure relates to the field of drive motors, and more particularly to a drive motor and a vehicle.

According to a first aspect of embodiments of the present disclosure, there is provided a drive motor, including: a stator, a rotor, a balance disc, and a rotation shaft. The rotor includes a rotor core and a permanent magnet in the rotor core, and the rotor core has a first end face and a second end face. The balance disc includes a first balance disc configured to abut against the first end face and a second balance disc configured to abut against the second end face. The first balance disc, the rotor core, and the second balance disc are fitted over the rotation shaft sequentially along an axial direction and are fixed by a locking member at an end. A circumferential limiting structure is arranged at least one of between the first balance disc and the first end face or between the second balance disc and the second end face. The circumferential limiting structure includes a convex key and a limiting hole fitted with the convex key. The convex key is on an end face of the balance disc facing the rotor core and protrudes from the end face along the axial direction.

According to a second aspect of the present disclosure, there is provided a vehicle including a drive motor. The drive motor includes a stator, a rotor, a balance disc, and a rotation shaft. The rotor includes a rotor core and a permanent magnet in the rotor core, and the rotor core has a first end face and a second end face. The balance disc includes a first balance disc configured to abut against the first end face and a second balance disc configured to abut against the second end face. The first balance disc, the rotor core, and the second balance disc are fitted over the rotation shaft sequentially along an axial direction and are fixed by a locking member at an end. A circumferential limiting structure is arranged at least one of between the first balance disc and the first end face or between the second balance disc and the second end face. The circumferential limiting structure includes a convex key and a limiting hole fitted with the convex key. The convex key is on an end face of the balance disc facing the rotor core and protrudes from the end face along the axial direction.

BRIEF DESCRIPTION OF DRAWINGS

The accompanying drawings, which are incorporated in and constitute a part of this specification, illustrate embodiments consistent with the present disclosure, and serve to explain the principle of embodiments of the present disclosure together with the specification.

DETAILED DESCRIPTION

Figure 1:
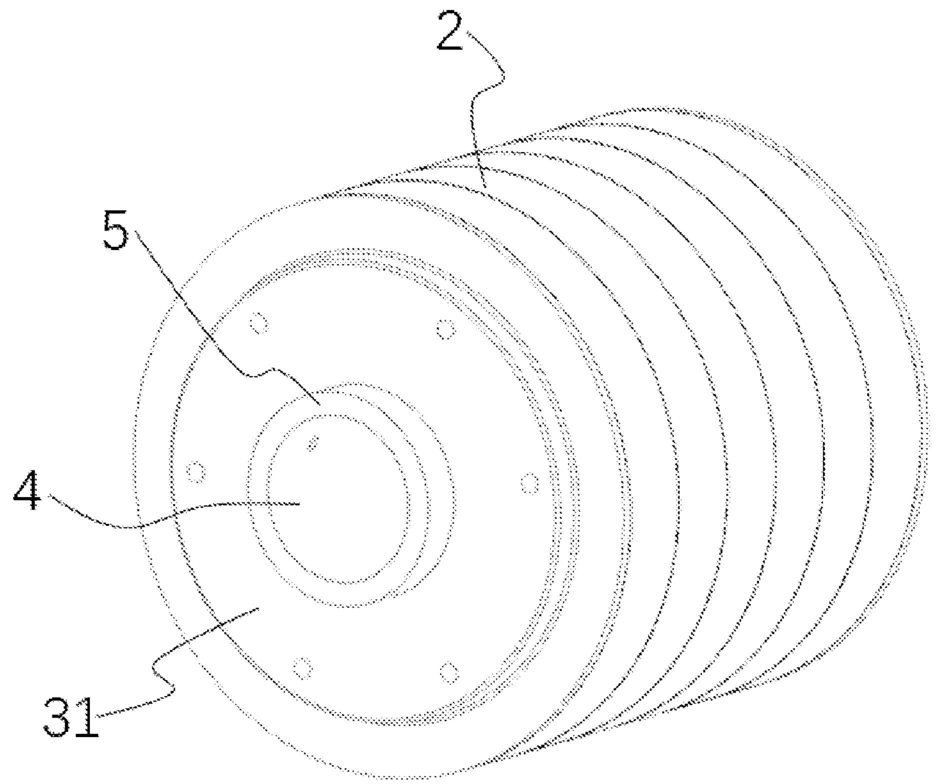
FIG. 1 is a schematic view of a drive motor according to an embodiment, with a stator hidden.
Figure 2:
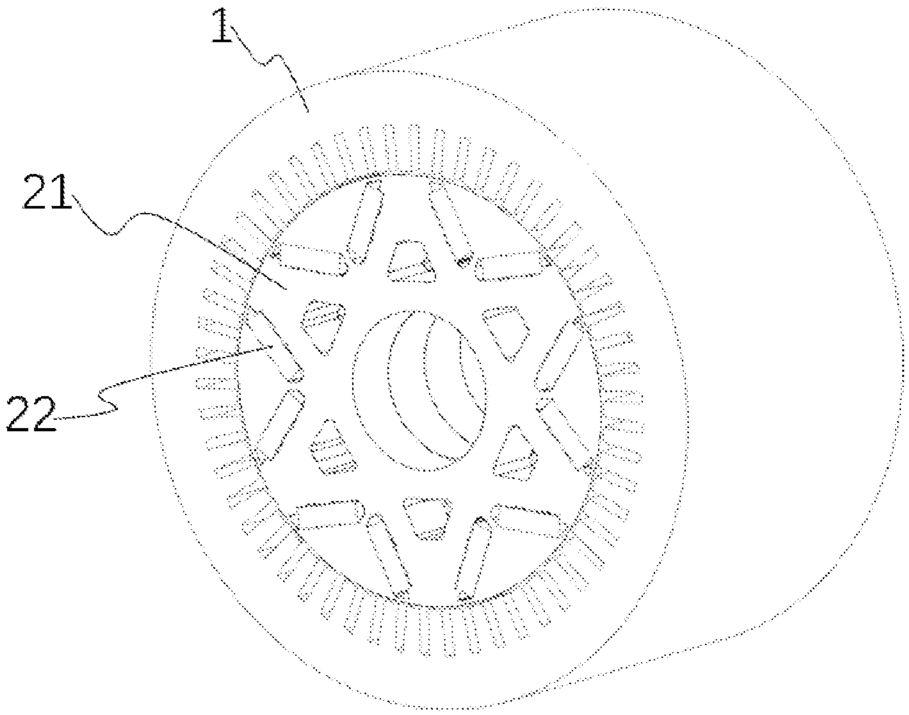
FIG. 2 is a schematic view of a stator and a rotor core in a drive motor being assembled according to an embodiment.

Embodiments of the present disclosure will be described in detail and examples thereof will be shown in drawings. The following description refers to the accompanying drawings in which the same numbers in different drawings represent the same or similar elements unless otherwise represented. Implementations set forth in the following description of the embodiments do not represent all implementations consistent with the present disclosure. Instead, they are merely examples of devices and methods consistent with aspects of the present disclosure as recited in the appended claims.

It should be noted that all actions of obtaining signals, information or data in the present disclosure are performed in compliance with national data protection regulations and policies and with authorization granted by corresponding device owners.

In the present disclosure, unless specified otherwise, directional terms such as “axial,” “circumferential,” “radial” are usually defined relative to an axis of rotation of a rotor in a drive motor, while “inner” and “outer” refer to inner and outer contours of a component. The use of terms such as “first” and “second” is intended to distinguish one component from another and does not indicate any sequence or importance. In addition, in the following description referring to the accompanying drawings, the same reference numerals in different drawings represent the same or similar elements unless otherwise explained.

In the related art, a rotor core is formed by a plurality of stacked silicon steel sheets. For a speed range of a current mainstream high-speed drive motor, the strength of the silicon steel sheets at high speed is a main bottleneck. A stress level of a balance disc may be satisfied by using a common die-casting material, and heat dissipation of a permanent magnet may be solved by a lightening hole or by oiling through the lightening hole.

In embodiments of the present disclosure, in terms of the strength of silicon steel sheets, a stress level of the silicon steel sheets at high speed is generally reduced by optimization or by installing a protective sleeve. The stress optimization typically refers to local stress optimization for silicon steel sheets of a motor rotor, including smooth transition via rounded corners in some areas with high stress, weight reduction in some areas to reduce centrifugal force, and so on. Current mainstream rotor designs adopt local stress optimization. However, the local stress optimization can only achieve a slight increase in speed and cannot significantly increase the motor speed, and hence cannot be considered as an effective solution for high-speed motors.

In addition, carbon fiber is used to wrap an outer ring of the motor rotor to achieve an increase in rotor speed, which is common in high-speed motor rotors of turbo compressors and the like. The carbon fiber is wrapped around an outer edge of the motor rotor to protect integrity of an internal structure of a rotor at high speed. However, the carbon fiber wrapping scheme increases an air gap between a stator and the rotor, diminishing motor performance to a certain extent. Moreover, the production rate of the carbon fiber is low, the cost is expensive and the production equipment is complex.

Based on the above content, to further increase the motor speed, not only the strength of silicon steel sheets but also the strength of balance discs should be taken into consideration, and the heat dissipation of permanent magnets should be further enhanced. Therefore, a systematic and complete solution is desirable.

In order to solve the above problems, as shown in FIGS. 1 to 16, the present disclosure provides a drive motor that includes a stator 1, a rotor 2, a balance disc 3, and a rotation shaft 4. The stator 1 is fitted over the rotor 2. The rotor 2 includes a rotor core 21 and a permanent magnet 22 in the rotor core 21. The rotor core 21 has a first end face and a second end face. The balance disc 3 includes a first balance disc 31 configured to abut against the first end face and a second balance disc 32 configured to abut against the second end face. The first balance disc 31, the rotor core 21 and the second balance disc 32 are fitted over the rotation shaft 4 sequentially along an axial direction and are fixed by a locking member 5 at an end. Here, it should be noted that the drive motor may be a permanent magnet synchronous motor and can be applied to various equipment in different industries such as vehicles, metallurgy, environmental protection, etc., which will not be limited in the present disclosure. The locking member 5 may be a nut, a press rivet ring, a circlip, an interference ring, etc., and can achieve axial fixed locking of the balance disc 3 and the rotor core 21 by cooperating with a shoulder of the rotation shaft 4. The first balance disc 31 and the second balance disc 32 may have the same structure or different structures, and may be made of materials such as steel, stainless steel and aluminum alloy. The present disclosure will be described in detail through an example where the locking member 5 is an interference ring and the balance disc 3 is made of aluminum alloy.

In the high-speed drive motor provided by the present disclosure, improvements are mainly made in three aspects: stress reduction of the balance disc 3, silicon-steel differentiation of the stator 1 and the rotor 2, and direct heat dissipation of the permanent magnet 22, aiming to solve problems related to the strength of the rotor core 21, the strength of the balance disc 3, the heat dissipation of the permanent magnet 22 at high speed. The three aspects will be described in detail to form a complete and systematic solution.

In a first aspect concerning the stress reduction of the balance disc, the strength of the balance disc can meet the requirements at a current mainstream speed stage of the drive motor, but as the speed needs to be further increased, the strength of the balance disc becomes a limiting factor. In relevant embodiments of the present disclosure, the rotation shaft 4 and the balance disc 3 are positioned in a circumferential direction by providing a convex key on an inner ring of the balance disc 3 and providing a keyway on an outer circumferential wall of the rotation shaft 4, and the balance disc 3 and the rotation shaft 4 are locked in the circumferential direction by cooperation between the convex key and the keyway. After the speed is increased, significant stress concentration occurs in a keyway transition area of the inner ring of the balance disc, and the inner ring is prone to tearing in the keyway transition area under an action of centrifugal force, which results in failure. In order to solve this problem, in the relevant embodiments, the balance disc 3 and the rotation shaft 4 are positioned in the circumferential direction by an interference fit. However, especially when the balance disc is made of steel or stainless steel, because of a high density of the material and the action of centrifugal force at high speed, the structural strength of the balance disc itself is difficult to meet high-speed scenarios, and the high density causes a growing tendency of outward expansion of the inner ring under the action of centrifugal force, and a requirement for a large amount of interference. However, the strength of the balance disc will become a bottleneck when the amount of interference is increased. Overall, it is difficult to meet the high-speed scenarios.

Figure 3:
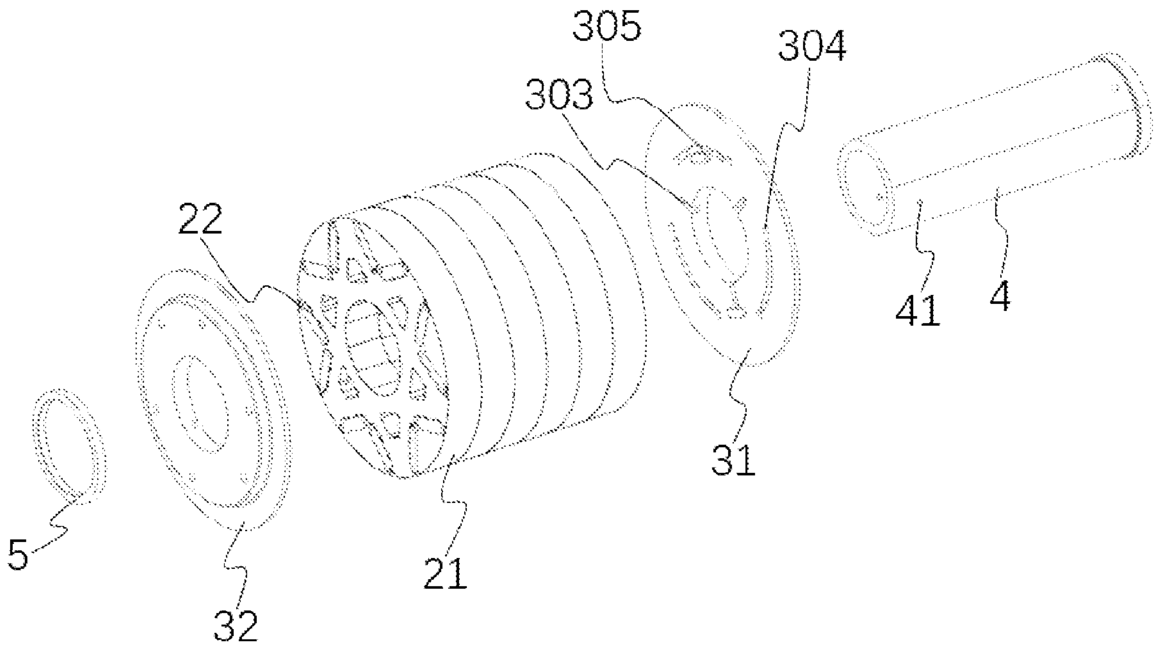
FIG. 3 is an exploded view of a drive motor according to an embodiment, with a stator hidden.
Figure 4:
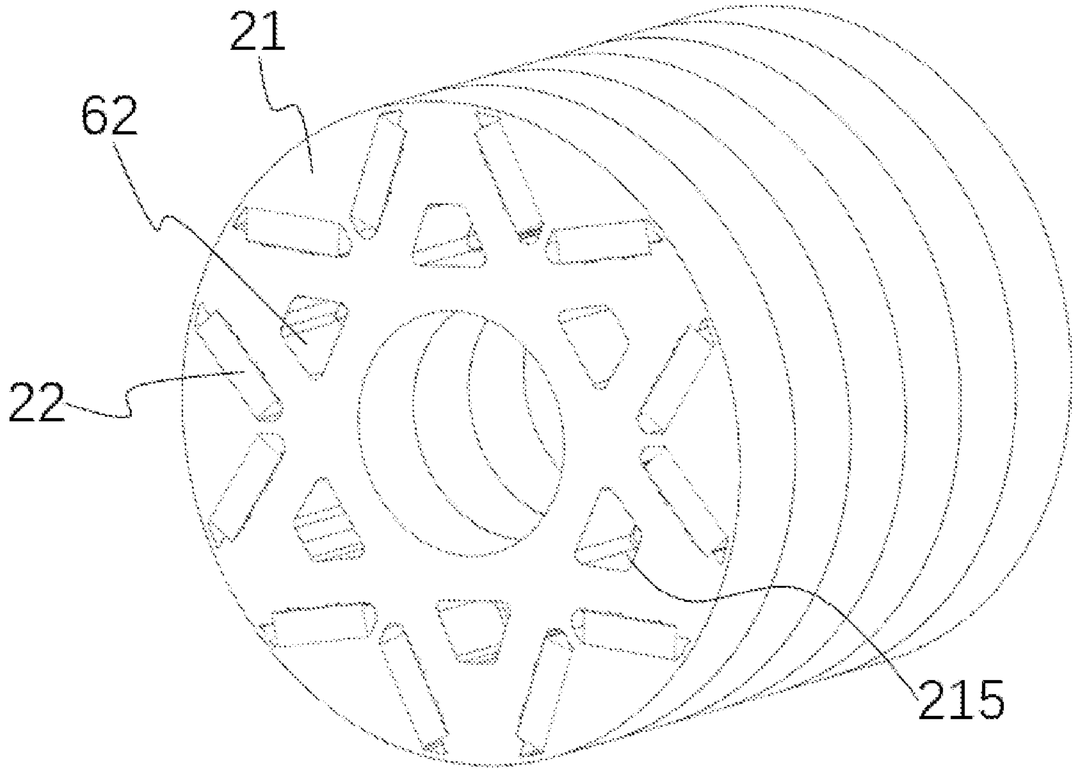
FIG. 4 is a schematic view of a rotor core in a drive motor according to an embodiment.
Figure 5:
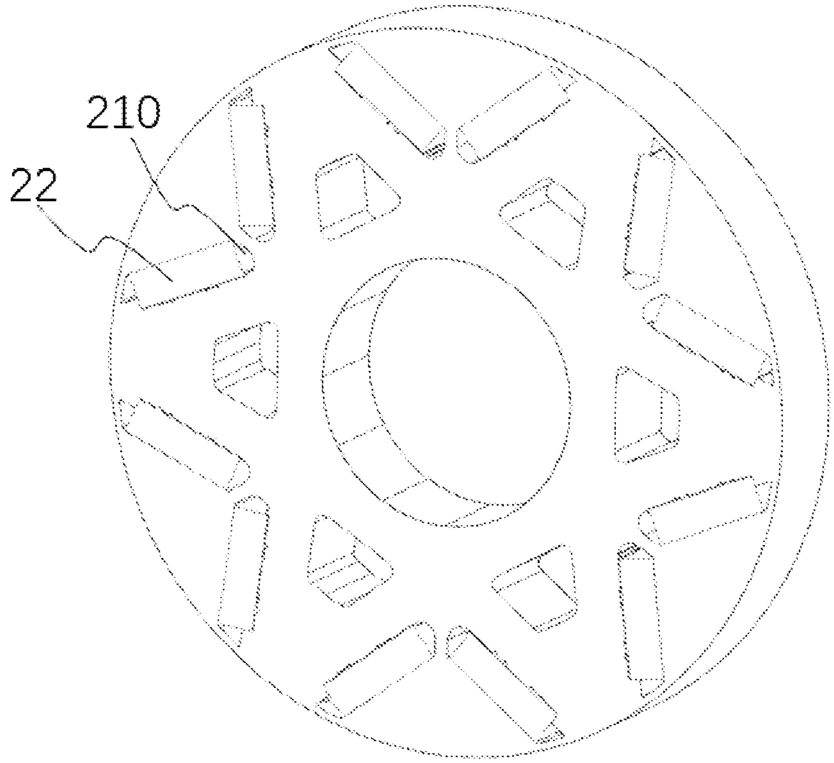
FIG. 5 is a schematic view of a silicon steel sheet in a drive motor according to an embodiment.
Figure 6:
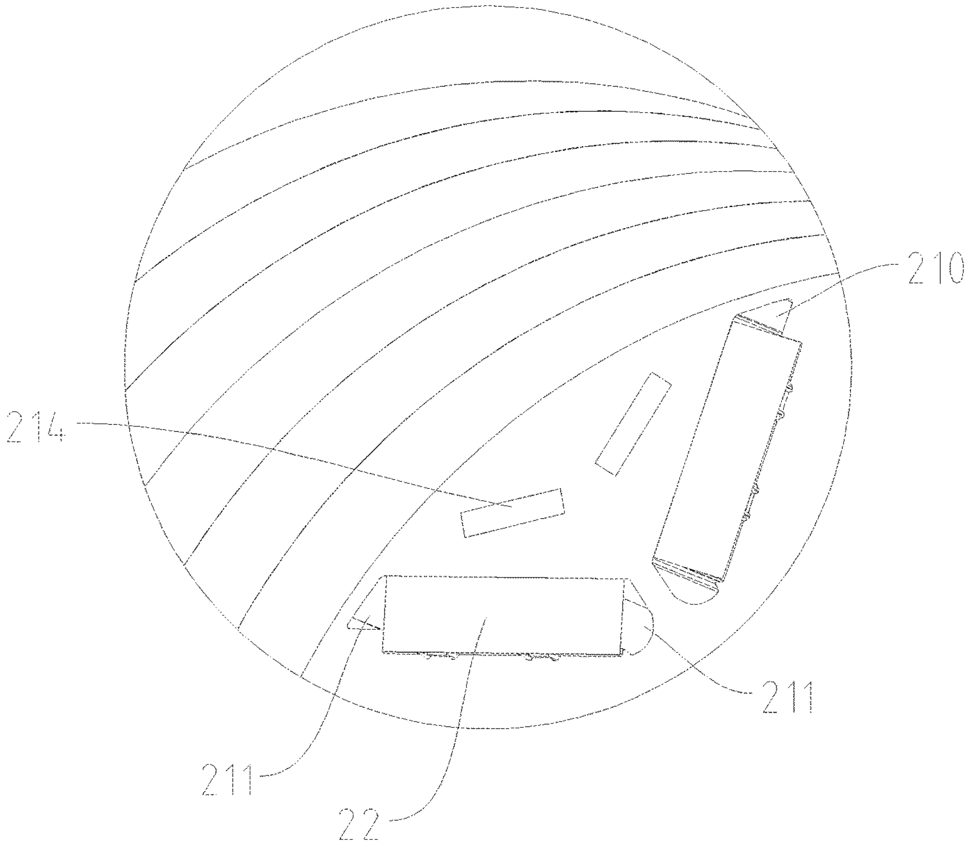
FIGS. 6 and 7 are partially enlarged views of a permanent magnet fixed in a drive motor according to an embodiment.
Figure 9:
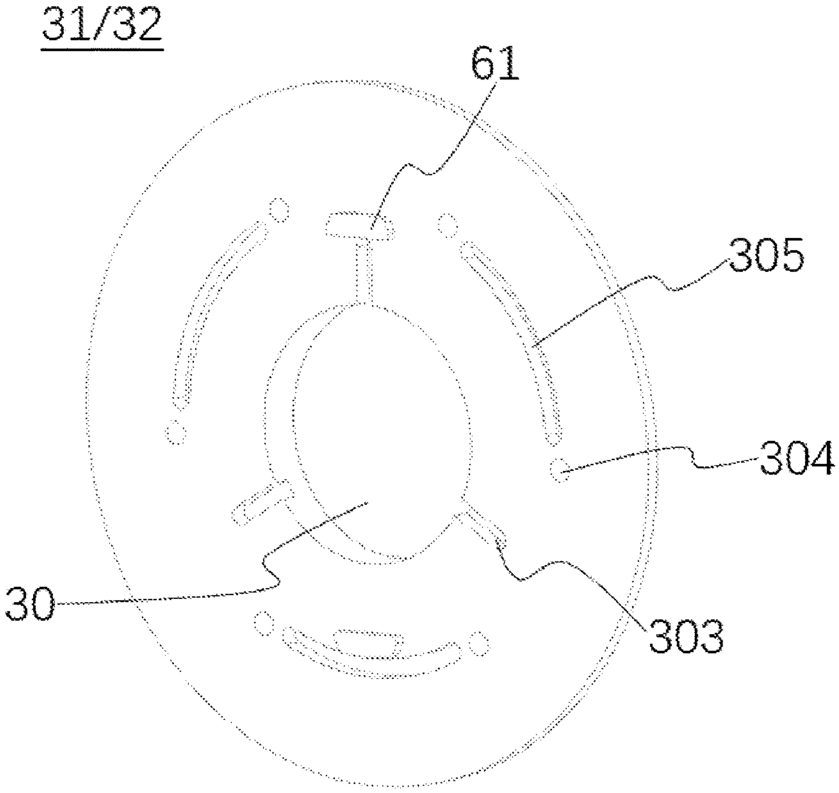
Figure 10:
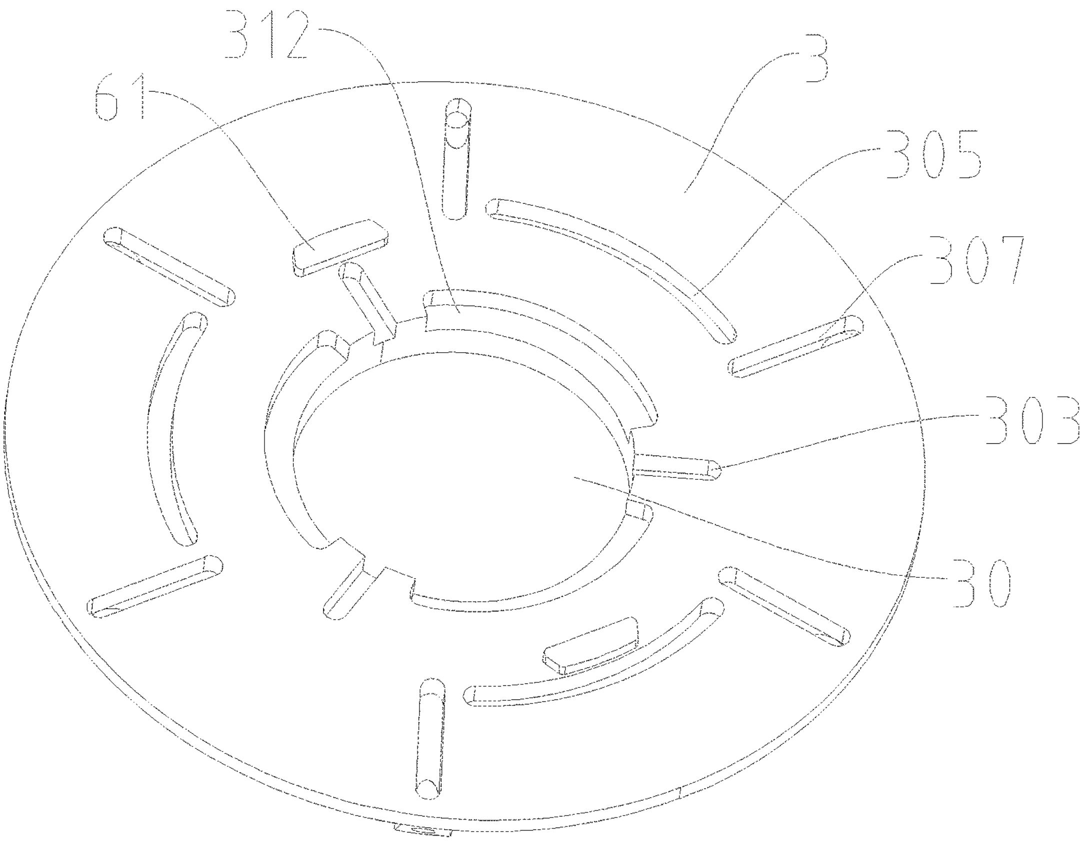
FIG. 10 is a perspective view of a first end face of a balance disc in a drive motor, according to an embodiment.

In order to solve the shortcomings of the circumferential limiting structure for the balance disc 3 and for the outer circumferential surface of the rotation shaft 4, the position of the circumferential limiting structure is adjusted in the present disclosure. As shown in FIG. 3, FIG. 9 and FIG. 10, the circumferential limiting structure is provided between the first balance disc 31 and the first end face, and/or between the second balance disc 32 and the second end surface. The circumferential limiting structure includes a convex key 61 and a limiting hole 62 fitted with the convex key 61. The convex key 61 is on an end face of the balance disc 3 facing the rotor core 21 and protrudes from the end face along the axial direction, and the limiting hole 62 is at a position of the rotor core 21 corresponding to the convex key 61. That is, by providing the circumferential limiting structure on the end face, the circumferential locking of the balance disc 3 and the rotor core 21 can be achieved, and the problem of stress concentration in the inner ring of the balance disc 3 during high-speed operation can be effectively avoided.

With the above technical solution, in the drive motor provided by the present disclosure, by adjusting the position of the circumferential limiting structure, the circumferential locking of the balance disc 3 and the rotor core 21 can be achieved; the problem of stress concentration in the inner ring of the balance disc 3 during high-speed operation can be effectively solved; the strength of silicon steel sheets of the rotor and the strength of the balance disc under high speed can be ensured; the speed increase of the drive motor can be effectively achieved; and hence the power density of the drive motor can be improved. Moreover, conventional rotor production processes, which are simple and mature, can be adopted.

The convex key 61 and the limiting hole 62 may be of any suitable configuration. The convex key 61 is on the end face of the balance disc 3 facing the rotor core 21, and the limiting hole 62 is on an end face of the rotor core 21. The balance disc 3 and the rotor core 21 can be circumferentially fixed by the cooperation between the convex key 61 and the limiting hole 62. There may be a plurality of limiting holes 62 on the end face of the rotor core 21, and part of the limiting holes 62 may be used as lightening holes 215. The limiting holes 62 and the lightening holes 215 may have the same shape or may be designed individually.

Figure 8:
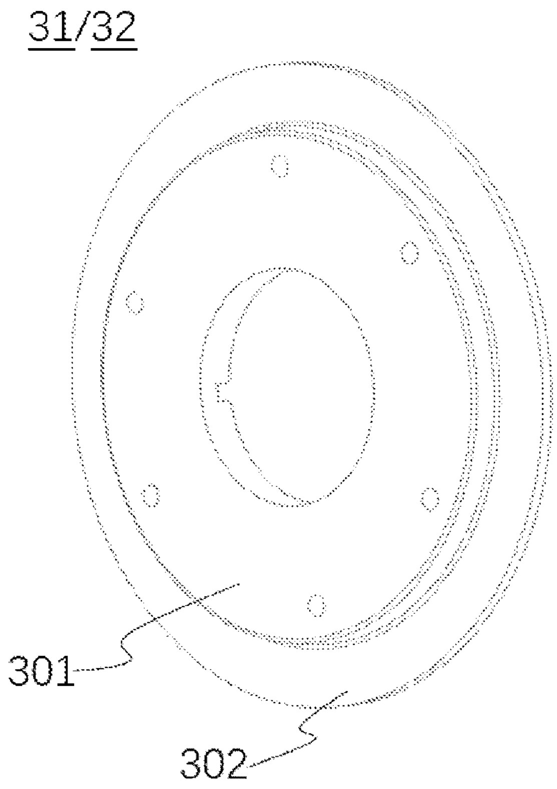
FIGS. 8 and 9 are schematic views of a balance disc in a drive motor according to an embodiment.

In the present disclosure, the convex key 61 and the limiting hole 62 may be in an interference fit, so that the balance disc 3 and the rotor core 21 may be prevented from relative movement in the circumferential direction and in the axial direction. Moreover, the rotor core 21 and the rotation shaft 4 are in an interference fit, and the rotor core 21 and the rotation shaft 4 are fixed in a large interference fit or a keyway fit, so that the balance disc 3 and the rotation shaft 4 can be fixed in the circumferential direction. As shown in FIGS. 8 and 9, the balance disc 3 has a central hole 30 for the rotation shaft 4 to pass through. The balance disc 3 is constructed in an annular structure having an inner ring and an outer ring, and the convex key 61 is between the inner ring and the outer ring. There are a plurality of convex keys 61 spaced apart from each other in the circumferential direction, and at least two convex keys are in a same radial direction and opposite to each other. That is, the convex keys 61 are arranged axis-symmetrically. In some embodiments, two convex keys are arranged at an angle of 180°. In other embodiments, there may be more than two convex keys 61 arranged uniformly in the circumferential direction, to achieve better circumferential fixation. In other embodiments, the convex key 61 and the limiting hole 62 may be of any suitable shape. As shown in FIG. 9, there are a plurality of circumferential limiting structures spaced in the circumferential direction; each convex key 61 has a trapezoidal structure, with an upper bottom and a lower bottom of the trapezoidal structure being perpendicular to a radial direction of the balance disc 3; and each limiting hole 62 is correspondingly a trapezoidal hole. In other embodiments, the convex key 61 may also have a cylindrical, square or other structure, which will not be limited in the present disclosure. In addition, for the convenience of assembly, four corners of the trapezoidal structure are designed as rounded corners to facilitate installation of the convex keys 61 and the limiting holes 62.

Furthermore, in order to further alleviate the centrifugal tearing effect on the inner ring of the balance disc at high speed, as shown in FIG. 10, in the present disclosure, the balance disc 3 has the central hole 30 through which the rotation shaft 4 passes. An end face of the balance disc provided with the convex key is denoted as a first end face, and another end face opposite to the first end face is denoted as a second end face. A stress relief groove 312 is on an outer circumference of the central hole 30 on the first end face, and the stress relief groove 312 is radially outwards from a circumferential wall of the central hole 30 and in connection with the central hole 30. In such a way, the stress at high speed can be effectively relieved while ensuring the stability of connection with the rotation shaft 4.

The stress relief groove 312 has a structure formed by a plurality of arc-shaped segments spaced apart from each other in the circumferential direction. Three segments of the stress relief groove 312 are shown in the drawings, and an oil guide groove 303 is between two adjacent segments of the stress relief groove 312. The oil guide groove 303 extends in the radial direction and has one end opened to be in connection with an oil inlet hole 41 on the rotation shaft 4. The oil guide groove 303, as well as an oil guide hole 304, an arc oil passage 305, an oil outlet groove 307 and an oil slinging hole 306, which will be described later, is related to a flow path of a cooling liquid, the function of which will be described later. The oil guide groove 303, the arc oil passage 305, and the oil outlet groove 307 are designed with an identical width "a", and may be designed according to a required flow rate of the cooling liquid. For example, the width "a" ranges from 2 mm to 6 mm. In other embodiments, the oil guide groove 303, the arc oil passage 305, and the oil outlet groove 307 are designed with different widths.

Figure 14:
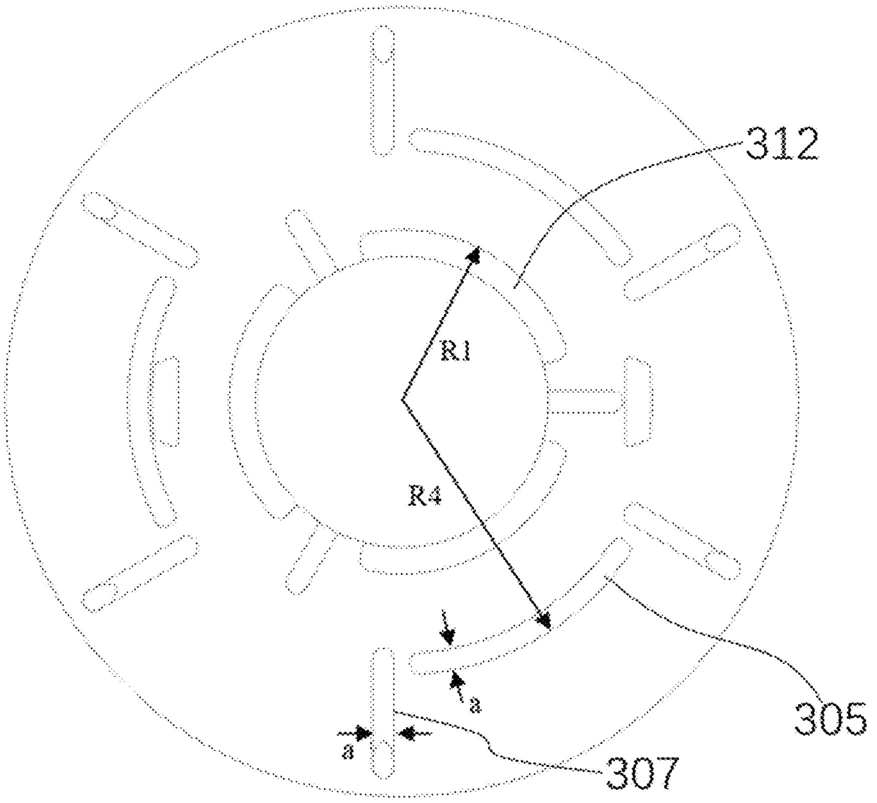
FIG. 14 is a top view of a first end face of a balance disc in a drive motor, according to an embodiment.

As shown in FIG. 14, a plurality of arc oil passages 305 are on the first end face of the balance disc 3, R1 represents an outer diameter of the stress relief groove 312, and R4 represents an outer diameter of each arc oil passage 305, in which $$R1 \leqslant R4 - a - 2d,$$

Figure 12:
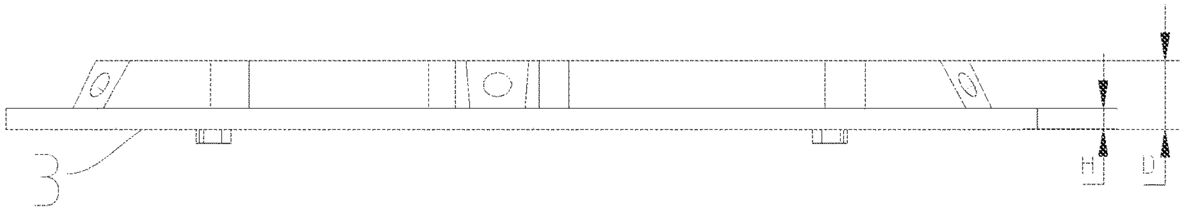
FIG. 12 is a side view of the balance disc in a drive motor, in an embodiment.
Figure 13:
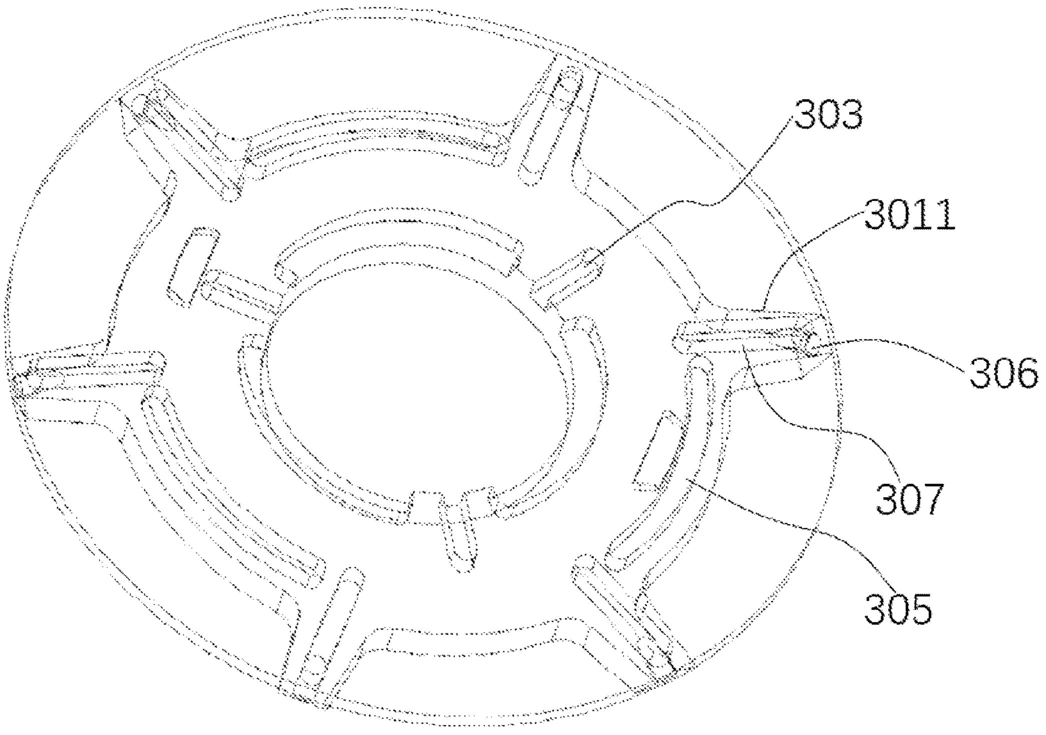
FIG. 13 is a perspective view of a balance disc in a drive motor, in an embodiment.

"a" represents a width of the arc oil passage 305 in the radial direction; "b" represents a diameter of a dynamic balance calibration drill bit; and "d" represents a residual wall thickness of a dynamic balance calibration area, d=D–b. As shown in FIG. 12, D represents a wall thickness of an intermediate portion 301 of the balance disc 3. Preferably, R1=R4–a–2d. The dynamic balance calibration of the balance disc adopts a weight removal method. By the balance calibration and the above dimension design, rotational balance of the balance disc can be ensured and the problem of stress concentration can be solved.

Figure 11:
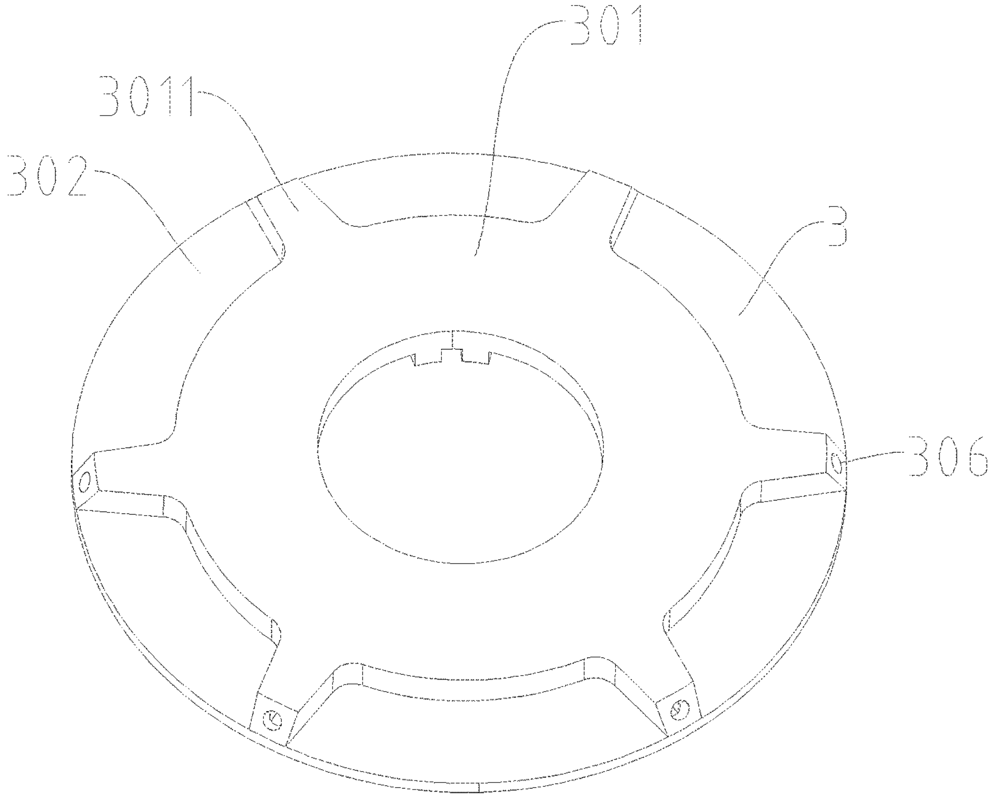
FIG. 11 is a perspective view of an intermediate portion of a balance disc in a drive motor, according to an embodiment.

Since the circumferential limiting structure is on the end face, the stress concentration of the inner ring of the balance disc can be relieved. However, due to the arrangement of the oil passage and the oil groove on the balance disc of the oil-cooled motor (which will be explained when it comes to direct cooling of the permanent magnet 22), large stress still exists at positions close to the oil passage and the oil groove of the inner ring at high speed. Furthermore, a weight reduction process is further carried out on the balance disc in the present disclosure. As shown in FIGS. 8 and 11, an end face, away from the convex key 61, of at least one of the first balance disc 31 or the second balance disc 32, that is, the second end face, has the intermediate portion 301 and a lightening portion 302 on a periphery of the intermediate portion 301, and a size of the lightening portion 302 in the axial direction is smaller than a size of the intermediate portion 301 in the axial direction. The stress level close to the groove of the inner ring of the balance disc can be greatly improved by the lightening structure of the outer ring of the balance disc.

In another embodiment of the present disclosure, as shown in FIG. 11, the lightening portion 302 is provided with a plurality of radial ribs 3011 extending radially outwards from the intermediate portion 301. The plurality of radial ribs 3011 divide the lightening portion 302 into a plurality of lightening zones. The oil outlet groove 307 extending in the radial direction on the first end face is at a position corresponding to each radial rib 3011, to avoid the lightening zones. The more weight the balance disc loses, the more the stress level at high speed lowers. Reducing weight while ensuring structural strength can improve the stress level of the balance disc. Moreover, the oil slinging hole 306 is at an end of each radial rib 3011 and in connection with the oil outlet groove 307.

Figure 15:
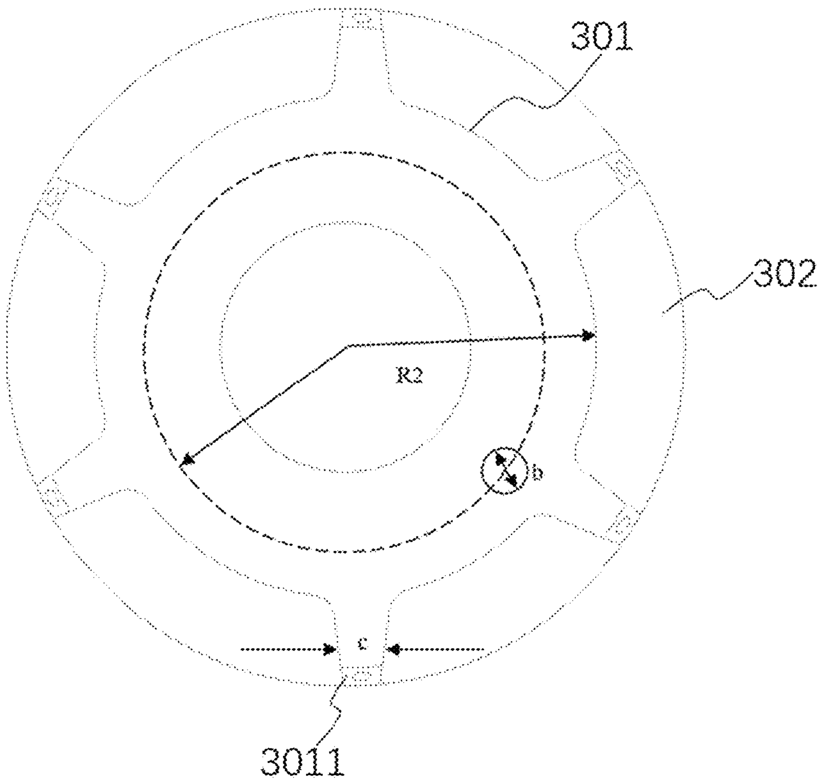
FIG. 15 is a top view of an intermediate portion of a balance disc in a drive motor, according to an embodiment.

Regarding a size ratio of the lightening portion 302, as shown in FIGS. 14 and 15, the plurality of arc oil passages 305 are arranged on the first end surface, R2 represents an outer diameter of the intermediate portion 301, and R4 represents the outer diameter of each arc oil passage 305, in which $$R2 \geqslant R4 + H.$$

As shown in FIG. 12, "H" represents a wall thickness of each lightening zone in the radial direction. Here, "H" represents an optimum casting thickness of a die casting, for example, 2 mm to 4 mm. In such a way, a weight reduction ratio is determined based on the position of the arc oil passages 305 and the wall thickness of the lightening zone.

The radial rib 3011 may be of any suitable structure. As shown in FIGS. 14 and 15, the width of the radial rib 3011 is denoted as "c", and the width of the arc oil passage 305 is denoted as "a", in which $c \geq a+2H$. The radial rib 3011 is configured to have a width gradually decreasing from inside to outside. Here, the width "c" is a minimum width. In such a way, the overall rigidity of the balance disc can be ensured.

In a second aspect concerning the silicon-steel differentiation of the stator 1 and the rotor 2, in relevant embodiments of the present disclosure, the stator 1 and the rotor 2 usually adopt the same silicon steel. The mainstream silicon steel has a yield strength of about 450 Mpa and an iron loss level of about 14 W/kg. With such silicon steel performance, the mainstream drive motor has a speed level of about 16000-18000 rpm, and the speed may be raised to 20000 rpm through stress optimization. However, if it is desired to further increase the speed, the strength of the silicon steel can no longer meet strength requirements. Moreover, the strength and iron loss of the silicon steel (the sum of hysteresis loss and eddy current loss per unit mass of a ferromagnetic material in an alternating and pulsating magnetic field) are interrelated. It is found that the iron loss of the drive motor mainly comes from the iron loss of the stator 1, followed by an eddy current loss of the permanent magnet 22, and then the iron loss of the rotor 2. The following table shows a composition analysis of a permanent magnet synchronous motor, with a stator iron loss accounting for 96% and a rotor iron loss accounting for 4%.

| current/ | iron loss/KW | |
|---|---|---|
| A | iron loss of stator | iron loss of rotor |
| 0 | 0.827 | 0.028 |
| 100 | 1.178 | 0.043 |
| 200 | 1.377 | 0.053 |
| 300 | 1.501 | 0.062 |
| 400 | 1.588 | 0.071 |
| 500 | 1.667 | 0.079 |
| 600 | 1.772 | 0.088 |

It can be seen from the above content that the overall loss of the machine is not sensitive to the iron loss of the rotor. On this basis, in the present disclosure, the stator 1 and the rotor 2 are made of silicon steel materials, and use two types of silicon steel with different properties. Here, the different properties mean different types of silicon steel, which can have different carbon or silicon contents, resulting in different strength and hence different iron loss. In other words, the motor speed is further increased by differentiating the types of silicon steel for the stator and the rotor. Specifically, the balance disc 3 is made of materials such as aluminum alloy, steel, and stainless steel. In terms of the strength, the strength of the balance disc 3, the stator 1 and the rotor 2 increases sequentially. In terms of the iron loss, the iron loss of the stator 1 is the least, the eddy current loss of the permanent magnet 22 takes the second place, and the iron loss of the rotor 2 is the most. That is, the stator 1 uses a type of silicon steel having small iron loss and mainstream strength, and the rotor 2 uses a type of silicon steel having high strength or even ultra-high strength, and a yield strength of 600 Mpa or above, but allows for a moderate increase in iron loss. By make the silicon steel of the stator 1 different from that of the rotor 2, the rotor core 21 can meet the strength requirement at high speed without increasing the air gap between the stator and the rotor and still using a conventional stamping process.

Figure 7:
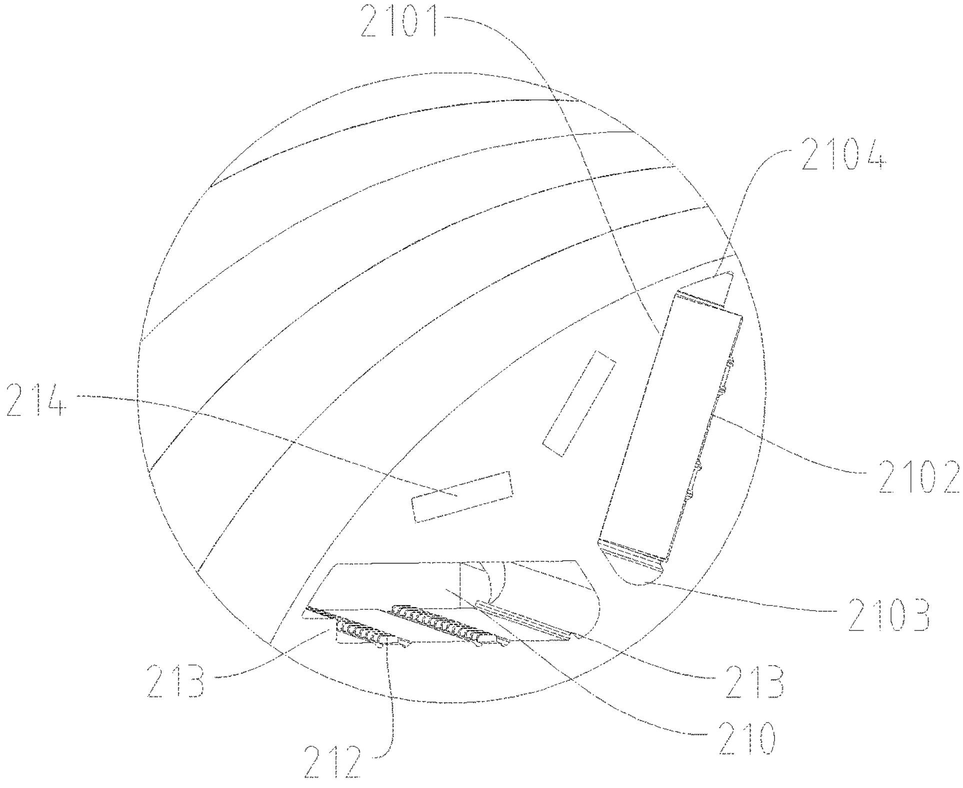

In a third aspect concerning direct cooling of the permanent magnet 22, during high-speed rotation of the rotor 2, the permanent magnet 22 generates severe heat, and an excessively high temperature may cause permanent demagnetization. If the speed of the drive motor needs to be significantly increased, the heat dissipation of the permanent magnet 22 will become a limiting condition for design of the high-speed drive motor. In order to solve this technical problem, as shown in FIG. 7, the rotor core 21 includes a receiving groove 210 for fixing the permanent magnet 22. A fixing portion is on an inner wall of the receiving groove 210 and is configured to fix the permanent magnet 22. A flow channel 211 for circulation of the cooling liquid is formed between the inner wall of the receiving groove 210 and the permanent magnet 22. Here, the cooling liquid may be water-cooled or oil-cooled, or may be other cooling media. As an example, an oil-cooled motor will be described in detail.

Figure 16:
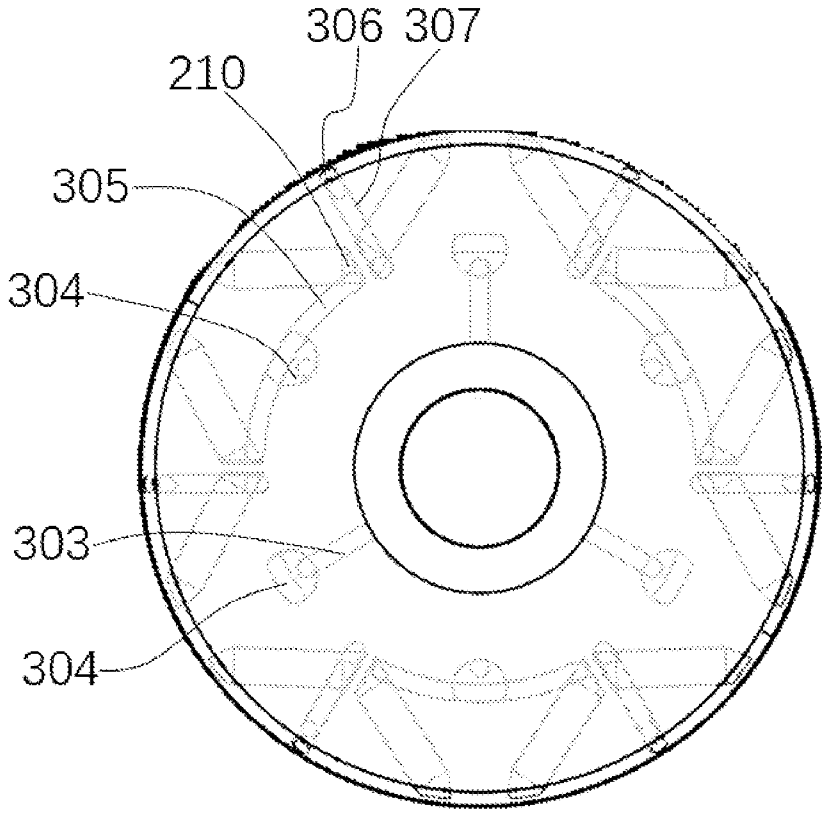
FIG. 16 is a schematic view of a flow path of a cooling liquid in a drive motor according to an embodiment.

There may be various sources of cooling oil in the flow channel 211. As shown in FIG. 3, the rotation shaft 4 includes a plurality of oil inlet holes 41; each of two balance discs includes the oil guide groove 303 and the arc oil passage 305; and the oil guide hole 304 is on the rotor core 21 or on the balance disc. The arc oil passage 305 is configured to connect flow channels 211 of two adjacent receiving grooves 210. The oil guide hole 304 corresponds to the arc oil passage 305 in position. In this way, a flow path of the oil for cooling the permanent magnet 22 is as follows: the cooling oil is introduced into the hollow rotation shaft 4; the cooling oil is driven to rotate along an inner wall of the rotation shaft 4 along with rotation of the rotor 2; and under the centrifugal force and oil pressure of the cooling oil, the cooling oil enters the oil guide groove 303, formed by the balance disc and the rotor core 21, through the oil inlet hole 41. As shown in FIG. 16, the cooling oil flows into the oil guide hole 304 through the oil guide groove 303, enters an end of the rotor core 21 (for example, flowing from the first end face to the second end face), and enters the flow channel 211 through the arc oil passage 305, to cool the permanent magnet 22. The cooling oil returns to the first end face of the rotor core 21 through the flow channel 211, passes through the oil outlet groove 307, and finally sprays obliquely through the oil slinging hole 306 towards an end winding of the stator 1. Here, there may be a variety of sources for the cooling oil in the flow channel 211 and various flow paths for an oil circuit, which will not be limited in the present disclosure.

The following table shows a comparison of temperature of the permanent magnet 22 in three solutions: direct oil feeding of the permanent magnet 22, oil feeding of the rotor core 21, and oil feeding of the rotation shaft 4. It can be clearly seen that the direct oil feeding of the permanent magnet 22 provided in the present disclosure can reduce the temperature of the permanent magnet 22 and avoid demagnetization caused by high temperature of the permanent magnet 22.

| Oil circuit solution | Magnetic steel temperature |
|---|---|
| Rotation shaft oil feeding + iron core oil feeding + magnetic steel oil feeding | 129° C. |
| Rotation shaft oil feeding + iron core oil feeding | 148° C. |
| Rotation shaft oil feeding | 178° C. |

By designing the positions and sizes of the oil guide groove 303, the arc oil passage 305 and the oil outlet groove 307 on the balance disc, the flow rate of the cooling liquid can be ensured, the rotational balance of the balance disc can be ensured, and a weight reduction design can be realized, improving the overall stress level of the balance disc.

In the present disclosure, the permanent magnet 22 is fixed in any suitable manner in the receiving groove 210. As shown in FIG. 7, the receiving groove 210 has a first surface 2101 and a second surface 2102 which are opposite to each other, as well as a first sidewall 2103 and a second sidewall 2104 which are opposite to each other. The flow channel 211 is formed between the first sidewall 2103 and a first side surface of the permanent magnet 22 and is also formed between the second sidewall 2104 and a second side surface of the permanent magnet 22. The first surface 2101 and the second surface 2102 both abut against the permanent magnet 22, and the permanent magnet 22 is fixed by an interference fit. In this way, the flow channels 211 are formed while the permanent magnet 22 is stably fixed in the receiving groove 210, and the permanent magnet 22 is in direct contact with the cooling oil to achieve the direct cooling and heat dissipation of the permanent magnet 22. In other embodiments, the permanent magnet 22 may also be fixed in the receiving groove 210 using methods such as glue dispensing, injection moulding, and epoxy potting.

There are various ways to mechanically fix the permanent magnet 22 in the receiving groove 210, that is, the fixing portion may be of any suitable structure. In an embodiment of the present disclosure, as shown in FIG. 7, a plurality of elastic pieces 212 are on the first surface 2101 and/or the second surface 2102, and the plurality of elastic pieces 212 are spaced apart from each other in the axial direction of the rotor core 21. In this way, after the permanent magnet 22 is inserted in the axial direction, the elastic pieces 212 deform and press against the permanent magnet 22, thereby fixing the permanent magnet 22.

In another embodiment of the present disclosure, as shown in FIG. 7, a pressing point 214 is on the rotor core 21 and at a position close to the first surface 2101 or the second surface 2102 of the receiving groove 210. After the permanent magnet 22 is inserted into the receiving groove 210, the pressing point 214 of the rotor core 21 is pressed in the axial direction using a pressing head, causing plastic deformation of the rotor core 21, and causing deformation of the first surface 2101 or the second surface 2102 in a direction close to the permanent magnet 22 to form the fixing portion, such that the fixing portion is arched toward an interior of the receiving groove 210 and presses the permanent magnet 22 tightly, achieving mechanical fixation of the permanent magnet 22. After the permanent magnet 22 is fixed, the flow channels 211 are formed between left and right ends of the permanent magnet and the first sidewall 2103 and the second sidewall 2104 to allow the cooling oil to flow, thereby achieving the direct cooling of the permanent magnet 22.

In the present disclosure, limiting protrusions 213 are arranged on the inner wall of the receiving groove 210 and to both sides of the permanent magnet 22. The fixation of the permanent magnet 22 is achieved by mutual cooperation among the limiting protrusions 213, the elastic pieces 212 and the pressing point 214. In other embodiments, one or two of the above three fixing means may be selected, which will not be limited in the present disclosure.

According to a second aspect of the present disclosure, there is also provided a vehicle including the above-described drive motor. The drive motor can be applied to new energy vehicles to realize high-speed driving and improve the power density of the drive motor. The present disclosure provides a complete set of optimization solutions from different aspects, such as the strength of the silicon steel sheets, the strength of the balance disc, and the heat dissipation of the rotor, during high-speed rotation of the rotor. Moreover, the production process of conventional rotors may be adopted without increasing production costs, which is relatively simple and mature. The vehicle has all the beneficial effects of the above-described drive motor, which will not be described in detail herein.

In some embodiments, the stator and the rotor are made of silicon steel materials; the balance disc is made of aluminum alloy, steel or stainless steel; and the stator and the rotor are made of two types of silicon steel with different properties.

In some embodiments, strength of the rotor is greater than strength of the stator; and/or the strength of the stator is greater than strength of the balance disc; and/or an iron loss of the stator is smaller than an iron loss of the rotor; and/or an eddy current loss of the permanent magnet is greater than the iron loss of the stator and smaller than the iron loss of the rotor.

In some embodiments, the convex key is in an interference fit with the limiting hole.

In some embodiments, the balance disc has a central hole for the rotation shaft to pass through; the balance disc is constructed in an annular structure having an inner ring and an outer ring, and the convex key is between the inner ring and the outer ring; there are a plurality of convex keys spaced apart from each other in a circumferential direction and a plurality of limiting holes spaced apart from each other in the circumferential direction, and at least two convex keys are in a same radial direction and opposite to each other, and at least two limiting holes are in the same radial direction and opposite to each other.

In some embodiments, the convex key has a trapezoidal structure, and an upper bottom and a lower bottom of the trapezoidal structure are perpendicular to a radial direction of the balance disc.

In some embodiments, four corners of the trapezoidal structure are rounded corners.

In some embodiments, an end face, away from the convex key, of at least one of the first balance disc or the second balance disc has an intermediate portion and a lightening portion on a periphery of the intermediate portion; and a size of the lightening portion in the axial direction is smaller than a size of the intermediate portion in the axial direction.

In some embodiments, the rotor core includes a receiving groove configured to fix the permanent magnet; a fixing portion is on an inner wall of the receiving groove and is configured to fix the permanent magnet; and a flow channel for circulation of a cooling liquid is formed between the inner wall of the receiving groove and the permanent magnet.

In some embodiments, the permanent magnet is inserted into the receiving groove along the axial direction, and the fixing portion includes a plurality of elastic pieces arranged on at least one inner wall of the receiving groove and spaced apparat from each other in the axial direction.

In some embodiments, each of the first end face and the second end face of the rotor core includes a pressing point close to the receiving groove, and the pressing point is pressed in the axial direction and forms a depression to fix the permanent magnet.

In some embodiments, limiting protrusions are arranged on the inner wall of the receiving groove and to both sides of the permanent magnet.

Other embodiments of the present disclosure may be conceivable for those skilled in the art after considering the specification and practicing the technical solutions disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are regarded as exemplary only, and the true scope of the present disclosure are indicated by the appended claims.

It should be understood that the present disclosure is not limited to the particular structures described above and shown in the drawings, and various modifications and changes can be made without departing from the scope of the present disclosure. The scope of the present disclosure is only limited by the appended claims.

What is claimed is:

1. A drive motor, comprising:

a stator;

a rotor, comprising a rotor core and a permanent magnet in the rotor core, wherein the rotor core has a first end face and a second end face;

a balance disc, comprising a first balance disc configured to abut against the first end face and a second balance disc configured to abut against the second end face; and a rotation shaft, wherein the first balance disc, the rotor core, and the second balance disc are fitted over the rotation shaft sequentially along an axial direction and are fixed by a locking member at an end, wherein a circumferential limiting structure is arranged at least one of between the first balance disc and the first end face or between the second balance disc and the second end face; the circumferential limiting structure comprises a convex key and a limiting hole fitted with the convex key; and the convex key is on an end face of the balance disc facing the rotor core and protrudes from the end face along the axial direction;

wherein an end face, away from the convex key, of at least one of the first balance disc or the second balance disc has an intermediate portion and a lightening portion on a periphery of the intermediate portion; and a size of the lightening portion in the axial direction is smaller than a size of the intermediate portion in the axial direction;

wherein the lightening portion has a plurality of radial ribs extending radially outwards from the intermediate portion, and the plurality of radial ribs divide the lightening portion into a plurality of lightening zones;

wherein each of a plurality of oil outlet grooves extending in a radial direction on the first end face is at a position corresponding to each corresponding radial rib to avoid the plurality of lightening zone; and wherein a plurality of arc oil passages are arranged on the end surface of the balance disc where the convex key is, and R2≥R4+H, wherein R2 represents an outer diameter of the intermediate portion, R4 represents an outer diameter of each arc oil passage and H represents a wall thickness of each lightening zone in the axial direction.

2. The drive motor according to claim 1, wherein the stator and the rotor are made of silicon steel materials; the balance disc is made of aluminum alloy, steel or stainless steel; and the stator and the rotor are made of two types of silicon steel with different properties.

3. The drive motor according to claim 2, wherein:

strength of the rotor is greater than strength of the stator;

the strength of the stator is greater than strength of the balance disc;

an iron loss of the stator is smaller than an iron loss of the rotor; or an eddy current loss of the permanent magnet is greater than the iron loss of the stator and smaller than the iron loss of the rotor.

4. The drive motor according to claim 1, wherein the convex key is in an interference fit with the limiting hole.

5. The drive motor according to claim 1, wherein:

the balance disc has a central hole for the rotation shaft to pass through;

the balance disc is constructed in an annular structure having an inner ring and an outer ring, and the convex key is between the inner ring and the outer ring;

there are a plurality of convex keys spaced apart from each other in a circumferential direction and a plurality of limiting holes spaced apart from each other in the circumferential direction, and at least two convex keys are in a same radial direction and opposite to each other, and at least two limiting holes are in the same radial direction and opposite to each other.

6. The drive motor according to claim 1, wherein the convex key has a trapezoidal structure, and an upper bottom and a lower bottom of the trapezoidal structure are perpendicular to a radial direction of the balance disc.

7. The drive motor according to claim 6, wherein four corners of the trapezoidal structure are rounded corners.

8. The drive motor according to claim 1, wherein the rotor core comprises a receiving groove configured to fix the permanent magnet; a fixing portion is on an inner wall of the receiving groove and is configured to fix the permanent magnet; and a flow channel for circulation of a cooling liquid is formed between the inner wall of the receiving groove and the permanent magnet.

9. The drive motor according to claim 8, wherein the permanent magnet is inserted into the receiving groove along the axial direction, and the fixing portion comprises a plurality of elastic pieces arranged on at least one inner wall of the receiving groove and spaced apart from each other in the axial direction.

10. The drive motor according to claim 8, wherein each of the first end face and the second end face of the rotor core comprises a pressing point close to the receiving groove, and the pressing point is pressed in the axial direction and forms a depression to fix the permanent magnet.

11. The drive motor according to claim 8, wherein limiting protrusions are arranged on the inner wall of the receiving groove and to both sides of the permanent magnet.

12. The drive motor according to claim 1, wherein there are a plurality of limiting holes, and part of the limiting holes are configured as lightening holes.

13. The drive motor according to claim 5, wherein the balance disc further has a stress relief groove on an outer circumference of the central hole, and the stress relief groove is radially outwards from a circumferential wall of the central hole and in connection with the central hole.

14. The drive motor according to claim 13, wherein the stress relief groove has a structure formed by a plurality of arc-shaped segments spaced apart from each other in the circumferential direction.

15. The drive motor according to claim 14, wherein an oil guide groove is between two adjacent segments of the stress relief groove, and the oil guide groove extends in the radial direction and has one end opened to be in connection with an oil inlet hole on the rotation shaft.

16. The drive motor according to claim 1, wherein the rotation shaft comprises a plurality of oil inlet holes; each of the first balance disc and the second balance disc comprises an oil guide groove and an arc oil passage; and the rotor core or on the balance disc comprises an oil guide hole.

17. The drive motor according to claim 16, wherein there are a plurality of receiving grooves, the arc oil passage is configured to connect flow channels of two adjacent receiving grooves, and the oil guide hole corresponds to the arc oil passage in position.

18. A vehicle, comprising a drive motor, wherein the drive motor comprises:

a stator;

a rotor, comprising a rotor core and a permanent magnet in the rotor core, wherein the rotor core has a first end face and a second end face;

a balance disc, comprising a first balance disc configured to abut against the first end face and a second balance disc configured to abut against the second end face; and a rotation shaft, wherein the first balance disc, the rotor core, and the second balance disc are fitted over the rotation shaft sequentially along an axial direction and are fixed by a locking member at an end, wherein a circumferential limiting structure is arranged at least one of between the first balance disc and the first end face or between the second balance disc and the second end face; the circumferential limiting structure comprises a convex key and a limiting hole fitted with the convex key; and the convex key is on an end face of the balance disc facing the rotor core and protrudes from the end face along the axial direction;

wherein an end face, away from the convex key, of at least one of the first balance disc or the second balance disc has an intermediate portion and a lightening portion on a periphery of the intermediate portion; and a size of the lightening portion in the axial direction is smaller than a size of the intermediate portion in the axial direction;

wherein the lightening portion has a plurality of radial ribs extending radially outwards from the intermediate portion, and the plurality of radial ribs divide the lightening portion into a plurality of lightening zones;

wherein each of a plurality of oil outlet grooves extending in a radial direction on the first end face is at a position corresponding to each corresponding radial rib to avoid the plurality of lightening zone; and wherein a plurality of arc oil passages are arranged on the end surface of the balance disc where the convex key is, and $R2 \geq R4+H$, wherein R2 represents an outer diameter of the intermediate portion, R4 represents an outer diameter of each arc oil passage and H represents a wall thickness of each lightening zone in the axial direction.

* * * * *